United States Patent [19]

Watanabe et al.

[11] 4,390,508
[45] Jun. 28, 1983

[54] PROCESS FOR RECOVERY OF ALUMINUM OXIDE FROM ALUMINUM COMPOUNDS CONTAINING FLUORINE

[75] Inventors: Morio Watanabe, Amagasaki; Sanji Nishimura, Kyoto; Nobuatsu Watanabe, Nagaokakyo, all of Japan

[73] Assignee: Solex Research Corporation of Japan, Tokyo, Japan

[21] Appl. No.: 333,294

[22] Filed: Dec. 22, 1981

[30] Foreign Application Priority Data

Dec. 29, 1980 [JP] Japan .................................. 55-187599

[51] Int. Cl.³ .............................................. C01F 7/02
[52] U.S. Cl. ..................................... 423/112; 423/625
[58] Field of Search ......................... 423/112, 625, 465

[56] References Cited

U.S. PATENT DOCUMENTS

| | | | |
|---|---|---|---|
| 4,233,273 | 11/1980 | Meyer et al. | 423/112 |
| 4,248,849 | 2/1981 | Skaria et al. | 423/489 |
| 4,334,999 | 6/1982 | Cornwell et al. | 423/112 |

OTHER PUBLICATIONS

Wells et al., "Nuclear Science and Engineering", vol. 17, 1963, pp. 259–267.

Grinstead et al., "Nuclear Science and Engineering", vol. 28, 1967, pp. 346–352.

Primary Examiner—Herbert T. Carter
Attorney, Agent, or Firm—Toren, McGeady and Stanger

[57] ABSTRACT

A process for the production of aluminum oxide from aluminum compounds containing fluorine comprising:

(1) extracting aluminum ions with an organic solvent containing one or more compounds selected from the groups of alkyl phosphoric acid, alkyl and aryl thio phosphoric acid, carboxylic acid and hydroxime together with a petroleum hydrocarbon as a diluent;

(2) preparing aluminum compounds containing fluorine by stripping the aluminum ions in the resultant organic solvent from the step (1) in contact with an aqueous solution containing one or more compounds selected from the groups of HF, $NH_4HF_2$, $NH_4F$ or $KHF_2$ and simultaneously regenerating the organic solvent; and (3) producing aluminum oxide by heating the resultant aluminum compounds containing fluorine from the step (2) in gas stream containing oxygen or $H_2O$.

2 Claims, 3 Drawing Figures

PROCESS FOR RECOVERY OF ALUMINUM OXIDE FROM ALUMINUM COMPOUNDS CONTAINING FLUORINE

BACKGROUND OF THE INVENTION

This invention relates to a process for production of aluminum oxide by heating compounds containing aluminum and fluorine in a gas stream containing oxygen or $H_2O$.

For production of metallic aluminum, it has been a conventional practice that alumina is produced by leaching of raw materials, such as bauxite, containing aluminum with sodium hydroxide, then hydrolysis of thus obtained sodium aluminate to obtain aluminum hydroxide which is calcined to obtain alumina, and then the powder alumina is subjected to electrolytic reduction in a fused cryolite bath to obtain metallic aluminum.

However, the following disadvantages are found in the conventional process of alumina production.

(1) A large amount of energy is required for concentration of sodium hydroxide diluted in the hydrolysis process in order to recover the used sodium hydroxide.

(2) Problems are caused by disposal on the sea of leached residues (red mud) from a view point of environmental protection.

SUMMARY OF THE INVENTION

This invention provides a novel process for the production of aluminum oxide from compounds containing aluminum and fluorine while avoiding the disadvantages of the prior art outlined above. This is accomplished by extracting the aluminum ions from the raw material with an organic solvent, reacting the aluminum ions therein to form compounds containing aluminum and fluorine while regenerating the solvent, and heating the thus produced compounds to produce aluminum oxide.

This invention will be described with reference to the attached drawings.

DETAILED DESCRIPTION OF THE INVENTION

Figure 1:
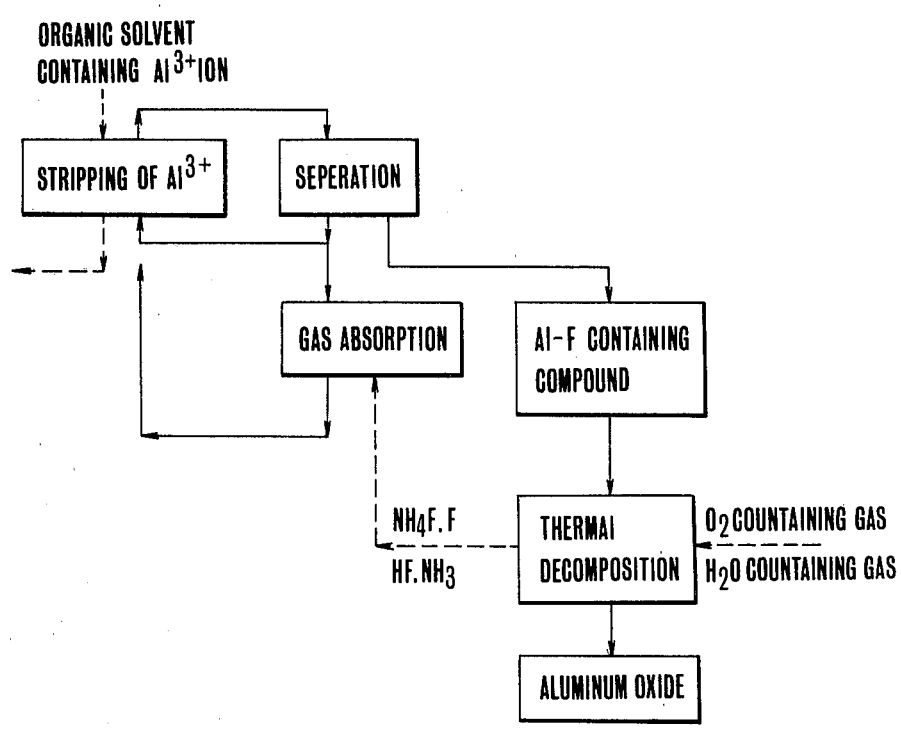
FIG. 1 shows the process flowsheet of this invention.

Aluminum ions extracted into an organic solvent are transferred into an aqueous phase from the organic phase by contact with a stripping agent containing one or more compounds selected from the group consisting of HF, $NH_4HF_2$, $NH_4F$ and $KHF_2$ and simultaneously the organic solvent is regenerated. (See FIG. 1 - Aluminum ion stripping process) The aluminum ions transferred into the aqueous phase produce crystals of compounds containing fluorine according to the following reactions.

$$R_3Al + 3HF \rightleftarrows 3HR + AlF_3 \downarrow$$

$$R_3Al + 3NH_4HF_2 \rightleftarrows 3HR + (NH_4)_3AlF_6 \downarrow$$

$$R_3Al + 3KHF_2 \rightleftarrows 3HR + K_3AlF_6 \downarrow$$

where HR indicates the regenerated organic solvent having an exchanger of proton type.

The produced crystals are filtered out. (See FIG. 1 - Separation process) and the regenerated organic solvent is recycled for extraction of aluminum ions. These crystals of the compounds containing fluorine may be re-melted and recrystallized in order to produce high-purity alumina if necessary.

In the next stage, the resultant aluminum compounds containing fluorine can be converted into alumina by heating them in gas stream containing oxygen or $H_2O$ in accordance with the following reaction formula. (See FIG. 1 - Thermal decomposition process)

$$2AlF_3 + 1\tfrac{1}{2}O_2 \rightleftarrows Al_2O_3 + 6F$$

$$2(NH_4)_3AlF_6 + 3H_2O \rightleftarrows Al_2O_3 + 6NH_4F + 6HF$$

$$2K_3AlF_6 + 3H_2O \rightleftarrows Al_2O_3 + 6KF + 6HF$$

The by-product $NH_4F$ and HF are absorbed and collected into the aqueous solution and reused for stripping the aluminum ions extracted into the organic solvent. (See FIG. 1 - Gas absorption process)

If $H_2O$ is present in the hydrogen gas stream, these aluminum compounds containing fluorine are decomposed into aluminum oxide and HF or $NH_4F$ by heating them in hydrogen gas stream. The resultant aluminum oxide is not $Al_2O_3$ and can be regarded to be a lower aluminum oxide as determined by X-ray diffraction spectrum analysis. Metallic aluminum can be obtained by fused-salt electrolysis of the above aluminum oxide charged into a $Na_3AlF_6$ bath contained in an electrolytic cell.

Alkyl phosphoric acid used as an extractant in this invention is selected from the compounds (A)-(F) shown below:

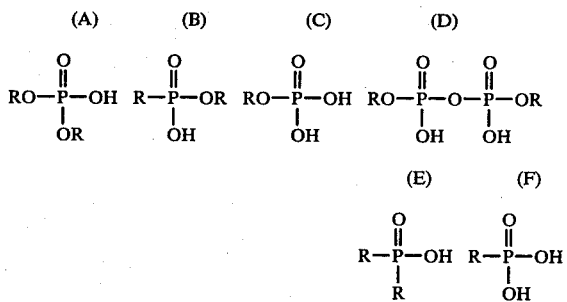

where R is alkyl radical containing 4 to 22 carbon atoms. D2EHPA(di-2-ethyl hexyl phosphoric acid) shown in the example set forth hereinafter belongs to the (A) group having alkyl radical of $C_8H_{17}$.

Further alkyl phenyl phosphoric acid having the following general formula may be used:

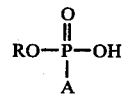

R = alkyl radical 4 to 22 carbon atoms
A = phenyl
OPPA (octyl phenyl P.A.) shown in the example
A = C$_6$H$_5$—

The extractant of alkyl or aryl thio phosphoric acid groups used in this invention is selected from the compounds shown below:

(G)
$$RO-\underset{OR}{\overset{S}{\underset{\|}{P}}}-OH$$

(H)
$$RO-\underset{OR}{\overset{S}{\underset{\|}{P}}}-SH$$

where R is alkyl or aryl radical having 4 to 22 carbon atoms.

D2EHDTPA(di-2-ethyl hexyl dithio phosphoric acid) shown in the example set forth hereinafter belongs to the (H) group having alkyl radical of C$_8$H$_{17}$.

One sample of hydroxime used as an extractant in this invention is shown below:

(I)

where R is and X is Cl or H. Of course, similar hydroximes can be used.

In SME-529 (tradename, produced by Shell Chemical Co.) in the example set forth hereinafter, R is CH$_3$ and X is H.

The extractants of carboxylic acid group used in this invention include the compounds shown below:

(J)
$$R-\underset{R}{\overset{R}{\underset{|}{\overset{|}{C}}}}-COOH$$

(K)

where R is alkyl radical having 4 to 18 carbon atoms.

Versatic acid 10(V-10) (tradename, produced by Shell Chemical Co.) shown in the example set forth hereinafter belongs to the (J) group having alkyl radical of 9 to 11 carbon atoms.

The diluent used in this invention is alphatic or aromatic hydrocarbon, etc., but a mixture of these compounds can be also used. Moreover, commercially available mixtures of various hydrocarbons, such as kerosene, may often be used.

Although the concentration of extractant in the organic solvent is determined according to aluminum ion concentration to be extracted into the organic phase, the nature of the aqueous solution containing aluminum ions to be treated and the type and amount of the included impurities, it commonly lies in the range of 2 to 80 volume %.

The present invention will be better understood from the following description of embodiments.

DESCRIPTION OF PREFERRED EMBODIMENTS

EXAMPLE

Aluminum compound containing fluorine is obtained by stripping aluminum ions extracted into the organic solvents shown below with the following stripping agents. The concentration of aluminum ions in the organic solvent was 8 to 11 g/l.

| Organic solvent | Stripping agent | | Stripping % | Product |
|---|---|---|---|---|
| 30% D2EHPA + 70% isoparaffine | 50 g/l | HF | 98.7% | AlF$_3$ |
| 20% D2EHDTPA + 10% OPPA + kerosene | 60 g/l | NH$_4$HF$_2$ | 81.4% | (NH$_4$)$_3$AlF$_6$ |
| 20% D2EHPA + 20% V-10 + n-paraffine | 100 g/l | NH$_4$HF$_2$ | 99.9% | (NH$_4$)$_3$AlF$_6$ |
| 30% V-10 + 10% AP-8R + isoparaffine | 50 g/l | HF | 69.9% | AlF$_3$ |
| 30% SME-529 + 5% V-10 + kerosene | 80 g/l | KHF$_2$ | 98.8% | K$_3$AlF$_6$ |
| 10% D2EHDTPA + 20% SME-529 + kerosene | 60 g/l | NH$_4$HF$_2$ | 84.1 | (NH$_4$)$_3$AlF$_6$ |

It is found from X-ray diffraction spectrum analysis that the crystal of (NH$_4$)$_3$AlF$_6$ obtained by the stripping includes a little amount of AlF$_3$ and so the product is not always the same chemical species.

Figure 2:
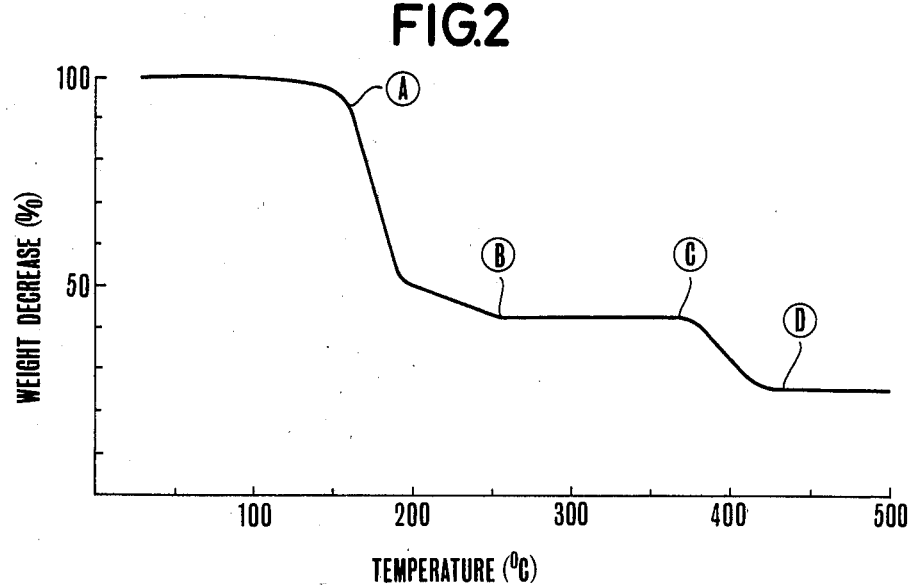
FIG. 2 is a graph showing the relation between temperatures and rates of weight decrease in heating aluminum compounds containing fluorine in an oxygen gas stream.

FIG. 2 shows the result of decreasing weight of the prepared aluminum compound containing fluorine by heating in gas stream containing oxygen of 21%.

Figure 3:
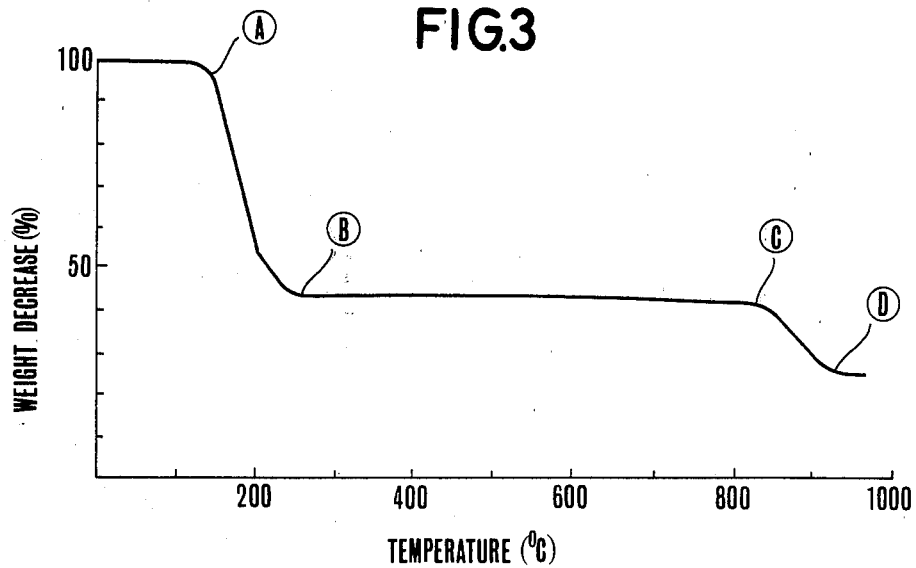
FIG. 3 is a graph showing the relation between temperatures and rates of weight decrease in heating compounds containing fluorine in a hydrogen gas stream including a small amount of water.

FIG. 3 shows the weight-decrease of the aluminum compound containing fluorine by heating in hydrogen gas stream containing a small amount of H$_2$O.

By heating in hydrogen gas stream, aluminum oxide (Al$_2$O$_3$) or fluoride can be produced dependent on the quality of hydrogen gas.

In FIG. 2, the thermal decomposition of ammonium aluminum fluoride to NH$_4$F starts at the point Ⓐ and changes to AlF$_3$ at the point Ⓑ.

$$(NH_4)_3AlF_6 \rightarrow AlF_3 + 3NH_4F \uparrow$$

The following chemical reaction starts at the point Ⓒ and converts to Al$_2$O$_3$ at the point Ⓓ.

$$AlF_3 + \tfrac{3}{2}O_2 \rightarrow \tfrac{1}{2}Al_2O_3 + 3F \uparrow$$

Therefore, if aluminum fluoride is fed, the process from the point Ⓐ to the point Ⓑ may be omitted.

As shown in FIG. 3 which shows weight-decrease by heating in hydrogen gas stream, the thermal decomposition of ammonium aluminum fluoride to NH$_4$F starts at the point Ⓐ and changes to AlF$_3$ at the point Ⓑ.

$$(NH_4)_3AlF_6 \rightarrow AlF_3 + 3NH_4F \uparrow$$

The decomposition of $AlF_3$ with a small amount of $H_2O$ starts at the point Ⓒ and converts to $Al_2O_3$ at the point Ⓓ.

$$AlF_3 + 3/2 H_2O \rightarrow \tfrac{1}{2} Al_2O_3 + 3HF \uparrow$$

It is confirmed from X-ray diffraction spectrum analysis that a lower aluminum oxide than $Al_2O_3$ may be produced dependent on the amount of $H_2O$.

What is claimed is:

1. A process for the production of aluminum oxide from $(NH_4)_3AlF_6$ or $K_3AlF_6$ comprising:

(1) extracting aluminum ions with an organic solvent containing one or more compounds selected from the groups of alkyl phosphoric acid, alkyl and aryl thio phosphoric acid, carboxylic acid and hydroxime together with a petroleum hydrocarbon as a diluent;

(2) preparing crystals of $(NH_4)_3AlF_6$ or $K_3AlF_6$ by stripping the aluminum ions in the resultant organic solvent from step (1) in contact with an aqueous solution containing one or more compounds selected from the group consisting of $NH_4HF_2$, $NH_4F$ or $KHF_2$ and simultaneously regenerating the organic solvent;

(3) separating said crystals;

(4) producing aluminum oxide by heating the resultant crystals from step (3) in a gas stream containing oxygen, $H_2O$, or $H_2$; and (5) recycling the gas generated during the heating of step (4) to the aqueous solution of step (2).

2. The process of claim 1 wherein the heating temperature in step (4) is between about 350° C. and 500° C. and the gas stream contains oxygen and $H_2O$.

* * * * *